United States Patent
Le Goualec et al.

(10) Patent No.: US 9,515,578 B2
(45) Date of Patent: Dec. 6, 2016

(54) CONTROL METHOD AND SYSTEM FOR CORRECTING THE VOLTAGES TO BE APPLIED TO AN ELECTRICAL LOAD

(71) Applicant: Schneider Toshiba Inverter Europe SAS, Pacy sur Eure (FR)

(72) Inventors: Philippe Le Goualec, Vernon (FR); Francois Malrait, Jouy sur Eure (FR); Patrice Ruault, Villepreux (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 14/347,388

(22) PCT Filed: Nov. 8, 2012

(86) PCT No.: PCT/EP2012/072152
§ 371 (c)(1),
(2) Date: Mar. 26, 2014

(87) PCT Pub. No.: WO2013/072246
PCT Pub. Date: May 23, 2013

(65) Prior Publication Data
US 2014/0233287 A1    Aug. 21, 2014

(30) Foreign Application Priority Data
Nov. 15, 2011 (FR) ...................... 11 60381

(51) Int. Cl.
*H02M 7/5387* (2007.01)
*G05F 1/10* (2006.01)
(Continued)

(52) U.S. Cl.
CPC ............ *H02M 7/53873* (2013.01); *G05F 1/10* (2013.01); *G05F 1/625* (2013.01); *H02M 7/53871* (2013.01); *H02M 2001/0025* (2013.01)

(58) Field of Classification Search
CPC .......... H02M 7/44; H02M 7/48; H02M 7/538; H02M 7/53871; H02M 7/53873; H02M 7/53875; H02M 7/539; H02M 7/5395; H02M 2001/0025; H02P 23/0095; H02P 27/04; H02P 27/045; H02P 27/047; H02P 27/06; H02P 27/08; H02P 27/085
(Continued)

(56) References Cited

U.S. PATENT DOCUMENTS 5,115,386 A * 5/1992 Shirahama et al. ............ 363/41
5,381,328 A    1/1995 Umezawa et al.
(Continued)

FOREIGN PATENT DOCUMENTS

EP    0 595 319    5/1994
EP    2 362 515    8/2011
(Continued)

OTHER PUBLICATIONS

International Search Report Issued Feb. 1, 2013 in PCT/EP12/072152 Filed Nov. 8, 2012.

*Primary Examiner* — Jessica Han
*Assistant Examiner* — Ivan Laboy Andino
(74) *Attorney, Agent, or Firm* — Oblon, McClelland, Maier & Neustadt, L.L.P.

(57) ABSTRACT

A control method to be implemented in a power converter, the power converter including an inverter module controlled by a control rule that makes it possible to determine a control voltage to be applied to an electrical load on the basis of a reference control voltage. The control method includes determining a correction value to be applied to the reference control voltage, the correction value being determined from a first filtered voltage obtained by filtering a voltage that is representative of the real measured voltage, and a second (Continued)

filtered voltage obtained by filtering a voltage that is representative of the reference control voltage.

8 Claims, 1 Drawing Sheet

(51) Int. Cl.
*G05F 1/625* (2006.01)
*H02M 1/00* (2006.01)

(58) Field of Classification Search
USPC ....... 323/271, 282–285, 351; 363/15–17, 55,
363/56.01–56.02, 57–58, 95–98, 109,
120, 363/131–132, 135.136
See application file for complete search history.

(56) References Cited

U.S. PATENT DOCUMENTS

| | | | | |
|---|---|---|---|---|
| 5,909,366 A | * | 6/1999 | Sanada | H02M 7/53875 363/17 |
| 6,552,606 B1 | * | 4/2003 | Veltman et al. | 330/10 |
| 2006/0008029 A1 | * | 1/2006 | Jafari et al. | 375/297 |
| 2010/0302825 A1 | * | 12/2010 | Ohshima et al. | 363/131 |
| 2011/0221420 A1 | | 9/2011 | Coccia et al. | |

FOREIGN PATENT DOCUMENTS

| | | |
|---|---|---|
| WO | 2004 006421 | 1/2004 |
| WO | 2009 138808 | 11/2009 |

* cited by examiner ically a load to be controlled.
CONTROL METHOD AND SYSTEM FOR CORRECTING THE VOLTAGES TO BE APPLIED TO AN ELECTRICAL LOAD

TECHNICAL FIELD OF THE INVENTION

The present invention pertains to a control method and system for correcting the control voltages to be applied to an electrical load.

PRIOR ART

In a known manner, a power converter comprises an inverter module furnished with several switching arms (for example three switching arms) each linked to an electrical load to be controlled. The switching arms are connected in parallel between two power supply lines connected to a voltage source. Each arm comprises for example at least two switches connected in series between the two power supply lines and a connection midpoint situated between the first switch and the second switch and connected to an electrical load. Each switch comprises for example a transistor and optionally a diode if the transistor is of IGBT type.

In a switching arm of a conventional inverter module, the two switches are controlled by complementary PWM signals, that is to say when one of the switches is in the closed state, the other switch is in the open state and vice versa. Furthermore, to prevent the two switches from being in the closed state at the same time, a dead-time is inserted between the closed state switching times of the two switches. During this dead-time, the two switches are therefore in the open state. Thus the short-circuit between the two power supply lines and the current spikes which could be caused by this short-circuit are assuredly avoided.

As a function of a desired voltage to be applied to the electrical load, each switching arm is controlled so as to obtain an output voltage. Because of the intrinsic voltage drop of each switch, of the resistance of each switch and of the insertion of the dead-times in the PWM control, it turns out that the output voltage actually applied is always different from the desired voltage. Consequently, it is necessary to put in place a voltage compensation so that each voltage actually applied to the electrical load is equal to the desired voltage. To address this problem, most procedures known in the prior art are implemented with the aid of complex instrumentation.

The aim of the invention is to propose a control method making it possible to compensate the non-linearities of the inverter module of a power converter, said control method being simple, less expensive and easy to implement.

DESCRIPTION OF THE INVENTION

This aim is achieved by a control method implemented in a power converter, said power converter comprising an inverter module controlled by a control law making it possible to determine a control voltage to be applied to an electrical load as a function of a reference control voltage, the control method comprising:
- a step of measuring a real voltage applied to the electrical load,
- a first step of filtering a voltage representative of the real voltage applied to the electrical load so as to obtain a first filtered voltage,
- a second step of filtering a voltage representative of the reference control voltage so as to obtain a second filtered voltage,
- a step of determining a correction value to be applied to the reference control voltage, said correction value being determined on the basis of the first filtered voltage and of the second filtered voltage.

According to a particular feature, the first filtering step is implemented by virtue of a low-pass filter of electronic type.

According to another particular feature, the second filtering step is implemented by virtue of a low-pass filter of software type.

According to another particular feature, the correction value is determined by employing a proportional-integral action corrector.

The invention also relates to a control system employed in a power converter, said power converter comprising an inverter module controlled by a control law making it possible to determine a control voltage to be applied to an electrical load as a function of a reference control voltage, the control system comprising:
- means for measuring a real voltage applied to the electrical load,
- first means for filtering a voltage representative of the real voltage applied to the electrical load so as to obtain a first filtered voltage,
- second means for filtering a voltage representative of the reference control voltage so as to obtain a second filtered voltage,
- means for determining a correction value to be applied to the reference control voltage as a function of the first filtered voltage and of the second filtered voltage.

According to a particular feature, the first filtering means comprise a low-pass filter of electronic type.

According to another particular feature, the second filtering means comprise a low-pass filter of software type.

According to another particular feature, the time constant of the first filtering means and the time constant of the second filtering means are substantially identical.

According to another particular feature, the correction value is determined by employing a proportional-integral action corrector.

According to the invention, using a low-pass filter of electronic type to filter the measured real voltage makes it possible to operate in slow time dynamics which correspond to the time dynamics of the current present in the output phase, this current corresponding to the final quantity to be controlled.

BRIEF DESCRIPTION OF THE FIGURES

Other characteristics and advantages will become apparent in the detailed description which follows while referring to an embodiment given by way of example and represented by the appended drawings in which.

DETAILED DESCRIPTION OF AT LEAST ONE EMBODIMENT

The invention applies to the control of a power converter and more precisely to the determination of a voltage correction to be applied to an electrical load L connected to the power converter.

Figure 1:
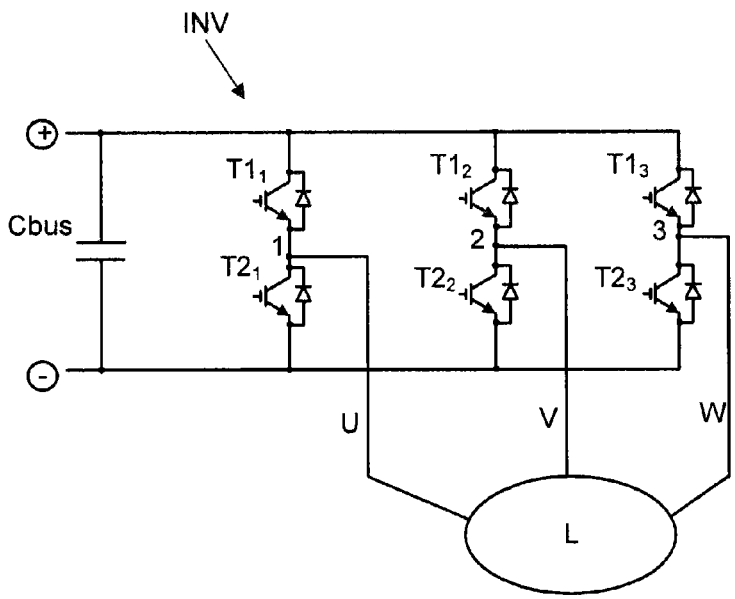
FIG. 1 represents the output stage of a power converter of variable speed drive type.

With reference to FIG. 1, a power converter comprises an inverter module INV with voltage source. The expression "inverter INV with voltage source" is understood to mean all the conventional inverters with two or more levels which comprise a DC power supply bus, as do the so-called flying capacitor inverters and the inverters of matrix converter type. The subsequent description is more particularly concerned with a conventional inverter with two levels but it must be understood that the invention applies to any type of power converter which comprises at least one switching arm able to be modeled by a switch.

In a known manner, a conventional inverter module INV such as represented in FIG. 1 comprises two power supply lines, a positive power supply line and a negative power supply line, between which are connected a bus capacitor Cbus and several switching arms 1, 2, 3 (three switching arms in FIG. 1). Typically, each switching arm 1, 2, 3 comprises at least two switches (T1$_1$, T2$_1$, T1$_2$, T2$_2$, T1$_3$, T2$_3$) connected between the two power supply lines. On each arm, a connection midpoint (also designated 1, 2, 3) situated between the two switches is connected to the electrical load L. Each switch comprises a transistor of IGBT, JFET type etc. If the transistor is of IGBT type, it is routinely associated with a diode.

In the subsequent description, it is considered that each switch (T1$_1$, T2$_1$, T1$_2$, T2$_2$, T1$_3$, T2$_3$) is composed of an IGBT transistor and of a diode.

Figure 2:
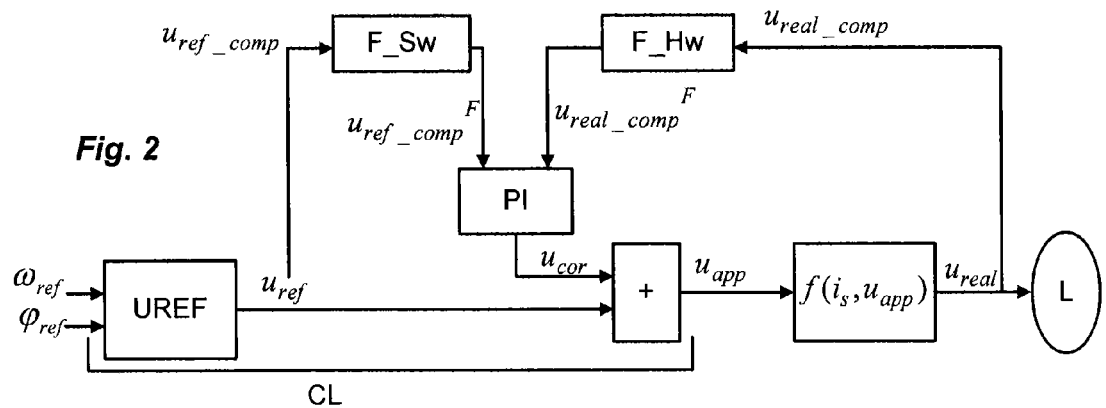
FIG. 2 represents a control schematic for a power converter, said schematic illustrating the control method of the invention.

With reference to FIG. 2, the switches of the inverter module INV are controlled by a control law CL executed by processing means of the power converter. In a known manner, a control law receives, as input, a flux reference $\phi_{ref}$ and a speed reference $\omega_{ref}$ to be applied to the electrical load L and makes it possible to determine the reference control voltages $u_{ref}$ to be applied ($u_{app}$) on each output phase U, V, W of the power converter which is connected to the electrical load L, as a function of this flux reference $\phi_{ref}$ and of this speed reference $\omega_{ref}$.

In the control law CL, it is known that the control voltages $u_{app}$ to be applied on each output phase U, V, W of the power converter are determined on the basis of reference control voltages $u_{ref}$ representative of the flux reference $\phi_{ref}$ and of the speed reference $\omega_{ref}$ which are applied as input to a reference voltage generator UREF.

In this configuration, it is known that the real voltages $u_{real}$ which are measured on the output phases do not correspond to the determined reference control voltages $u_{ref}$. This is due especially to the non-linearities of the inverter module, these non-linearities being due to the dead-times inserted between the switchings of the switches, to the durations of switching of the switches and to the intrinsic voltage loss of each switch.

The control method of the invention makes it possible to compensate the loss of voltage and to obtain real voltages $u_{real}$ measured on the output phases which are equal to the desired reference control voltages $u_{ref}$. The control system of the invention comprises the hardware and software means making it possible to implement this method.

The control method of the invention consists in determining, by virtue of calculation means, correction values $u_{cor}$ to be applied to each reference control voltage $u_{ref}$ so as to correct the corresponding control voltage $u_{app}$ to be applied to the electrical load L.

With reference to FIG. 2, the method consists in measuring the real voltages $u_{real}$ applied to the output phases connected to the electrical load L. These real voltages $u_{real}$ are for example recovered in the form of at least two compound voltages $u_{real\_comp}$ (compound voltage=voltage measured between two output phases). The real compound voltages are thereafter filtered, for example by a low-pass filter F_Hw of electronic (as opposed to software) type, so as to obtain filtered real compound voltages $u_{real\_comp}^F$.

In a corresponding manner, the control method consists in filtering, with the same time constant as the electronic filter described hereinabove, by a low-pass filter of software type F_Sw, the reference control voltages $u_{ref}$ also recovered in the form of compound voltages $u_{ref\_comp}$, in such a way as to obtain filtered reference compound voltages $u_{ref\_comp}^F$.

For the implementation of the invention, we have employed the compound voltages since two voltage measurements suffice to determine all the real simple voltages. However, it would have been possible to start directly from the real simple voltages measured on each output phase. The corresponding reference simple voltages would then be recovered to implement the method.

The filtered reference compound voltages $u_{ref\_comp}^F$ and the filtered real compound voltages $u_{real\_comp}^F$ are applied as input to a correction block making it possible to determine correction values $u_{cor}$.

The demonstration which follows makes it possible, on the basis of the following variables, to explain the principle of the correction to be applied:

$i_s$ corresponds to the current flowing in an output phase of the power converter, $u_{app}$ corresponds to the control voltage to be applied to the electrical load, $u_{real}$ corresponds to the real voltage which is applied to the electrical load, $u_{ref}$ corresponds to the reference control voltage making it possible to determine the control voltage to be applied to the electrical load, $u_{cor}$ corresponds to the calculated correction value making it possible to align the real voltage with the reference control voltage.

The model in terms of voltage on the output of the inverter module can be expressed by the following relation:

$$u_{real} = u_{app} + \text{perturbations}$$

in which the term perturbations must be eliminated so that the real voltage applied to the electrical load corresponds to the control voltage to be applied to the electrical load. As described previously, the term perturbations corresponds especially to the voltage losses in each switch of the inverter module, to the intrinsic resistance of each switch and is related to the sign of the current which flows in each phase.

According to the invention, the control voltage to be applied to the electrical load corresponds to the sum of the reference control voltage and of the correction value according to the following expression:

$$u_{app} = u_{ref} + u_{cor}$$

An electronic filtering of the real voltage is expressed by the following relation:

$$T \cdot \frac{d}{dt} u_{real}^F = u_{real} - u_{real}^F$$

In which:

T represents the time constant of the electronic filter, $u_{real}^F$ corresponds to the filtered real control voltage A software filtering of the reference control voltage is expressed by the following relation:

$$T \cdot \frac{d}{dt} u_{ref}^F = u_{ref} - u_{ref}^F$$

In which:

T represents the time constant of the software filter, identical to the time constant of the electronic filtering,
$u_{ref}^F$ corresponds to the filtered reference control voltage.
By defining $\Delta u = u^F - u_{ref}^F$
The definition of the error is obtained:

$$T \cdot \frac{d}{dt}\Delta u = u_{real} - u_{ref} - \Delta u$$

$$T \cdot \frac{d}{dt}\Delta u = -\Delta u + u_{app} + \text{pertubations} - u_{ref}$$

$$T \cdot \frac{d}{dt}\Delta u = -\Delta u + u_{cor} + \text{pertubations}$$

To reject the term perturbations, a proportional-integral action corrector PI can be employed in the following expressions:

$$u_{cor} = -K_P \cdot \Delta u - u_I$$
$$\frac{d}{dt}u_I = K_I \cdot \Delta u$$

in which $K_P$ and $K_I$ correspond to the gains of the proportional-integral action corrector PI.

Moreover, it is also possible to add an anticipative action ("feedforward") term to determine the correction value. The correction relations are then as follows:

$$u_{cor} = -\text{pertubations}_{EST} - K_P \cdot \Delta u - u_I$$
$$\frac{d}{dt}u_I = K_I \cdot \Delta u$$

In which the term perturbations$_{EST}$, which corresponds to the anticipative action term for example equal to Vcomp·sign($i_s$), represents an image of the perturbation function. Vcomp corresponds to a compensation voltage which causes the non-linearities of the inverter module.

By injecting into the proportional-integral action corrector PI the filtered reference control voltages, taken for example in the form of compound voltages, and the filtered real voltages measured on the output phases, taken for example in the form of compound voltages, it is thus possible to determine the correction values $u_{cor}$. These correction values $u_{cor}$ are added to the reference control voltages $u_{ref}$ in such a way as to obtain control voltages $u_{app}$ to be applied to the electrical load L which take account of the diverse perturbations, especially of the non-linearities (perturbations) in the switchings of the switches.

According to the invention, the control system can comprise means for deactivating the correction procedure described hereinabove when the speed of the motor becomes too high. Indeed, at high speed, the effects on the voltage that are caused by the dead times during the switchings of the switches become negligible, thereby rendering the correction procedure almost irrelevant.

The invention claimed is:

1. A control method implemented in a power converter, the power converter including an inverter controlled by a control law for determining a control voltage to be applied to an electrical load as a function of a reference control voltage, the control method comprising:

measuring, on output phases of the inverter, a real voltage applied to the electrical load;
first filtering the real voltage applied to the electrical load to obtain a first filtered voltage;
second filtering the reference control voltage to obtain a second filtered voltage;
calculating a compensation voltage that causes nonlinearities of the inverter;
calculating a correction value to be applied to the reference control voltage as a function of the first filtered voltage and the second filtered voltage by employing a proportional-integral action corrector with a difference term representing a difference between the first filtered voltage and the second filtered voltage and a feedforward term, which is distinct from the difference term and which is an anticipative action term that is calculated from the compensation voltage, to correct an effect of perturbations caused by the nonlinearities of the inverter such that the reference control voltage with the correction value applied thereto satisfies the control law; and
applying the correction value to the reference control voltage.

2. The method as claimed in claim 1, wherein
the inverter comprises a plurality of switches; and
the nonlinearities of the inverter used to calculate the compensation voltage comprise nonlinearities due to dead times inserted between switchings of the switches, durations of switching of the switches, and intrinsic voltage loss of each of the switches.

3. The method as claimed in claim 1, wherein the first filtering is implemented by a low-pass filter of electronic type.

4. The method as claimed in claim 1, wherein the second filtering is implemented by a low-pass filter of software type.

5. A control system employed in a power converter, the power converter including an inverter controlled by a control law for determining a control voltage to be applied to an electrical load as a function of a reference control voltage, the control system comprising:
circuitry configured to
measure, on output phases of the inverter, a real voltage applied to the electrical load;
filter the real voltage applied to the electrical load to obtain a first filtered voltage;
filter the reference control voltage to obtain a second filtered voltage;
calculate a compensation voltage that causes nonlinearities of the inverter;
calculate a correction value to be applied to the reference control voltage as a function of the first filtered voltage and of the second filtered voltage by employing a proportional-integral action corrector with a difference term representing a difference between the first filtered voltage and the second filtered voltage and a feedforward term, which is distinct from the difference term and which is an anticipative action term that is calculated from the compensation voltage, to correct an effect of perturbations caused by nonlinearities of the inverter such that the reference control voltage with the correction value applied thereto satisfies the control law; and
apply the correction value to the reference control voltage.

6. The system as claimed in claim 5, wherein the circuitry comprises a low-pass filter of electronic type configured to filter the real voltage.

7. The system as claimed in claim 5, wherein the circuitry comprises a low-pass filter of software type configured to filter the reference control voltage.

8. The system as claimed in claim 5, wherein the circuitry is configured such that a time constant used to filter the real voltage and a time constant used to filter the reference control voltage are substantially identical.

* * * * *